Figure 1:
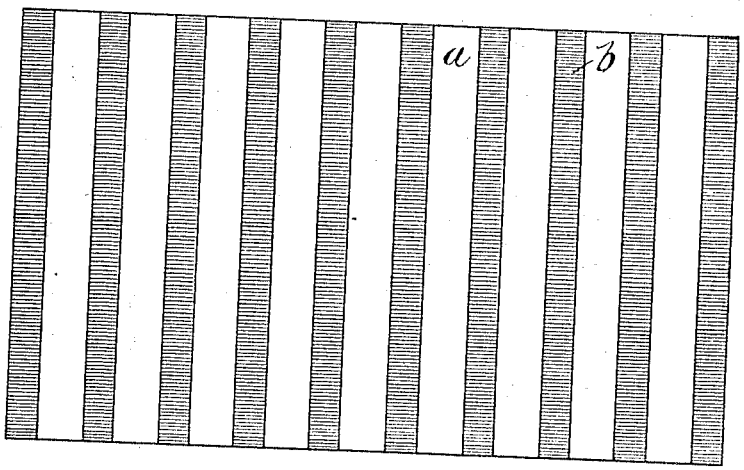

R. KRAYN.
PROCESS OF PRODUCING THREE-COLOR SCREENS.
APPLICATION FILED NOV. 17, 1909.

1,055,189. Patented Mar. 4, 1913.

Witnesses:
James B. Mansfield
L. E. Pitham

Inventor:
Robert Krayn
By: Alexander Dowell
Attorneys

UNITED STATES PATENT OFFICE.

ROBERT KRAYN, OF BERLIN, GERMANY, ASSIGNOR TO THE FIRM OF DEUTSCHE RASTER-GESELLSCHAFT MIT BESCHRÄNKTER HAFTUNG, OF BERLIN-STEGLITZ, GERMANY.

PROCESS OF PRODUCING THREE-COLOR SCREENS.

1,055,189.  Specification of Letters Patent.  Patented Mar. 4, 1913.

Application filed November 17, 1909. Serial No. 528,615.

*To all whom it may concern:*

Be it known that I, ROBERT KRAYN, a subject of the German Emperor, and resident of Berlin, Germany, have invented certain new and useful Improvements in Processes for Producing Three-Color Screens, of which the following is a specification.

This invention is based on the discovery, in the chemistry of colloids, that colored gelatin may be immunized against a great number of solutions of coloring matters by treating the colored gelatin with a tanning agent that is also a mordant for the coloring matter. Thus, for instance, ferric chlorid is both a mordant for "cinnabar-scarlet G" (of the Leipzig Aniline-Factory Beyer & Kegal), and also a tanning agent for gelatin. If therefore a gelatined glass plate, or celluloid film, is colored with a solution of such cinnabar-scarlet, and then dipped into a ten per cent. solution of ferric chloric, then washed, and the plate or film allowed to dry; the resultant red colored gelatin surface of the plate may be subjected to various green and blue solutions of coloring matter without being affected thereby.

If the red colored gelatin-surface were treated in a solution, for instance barium chlorid, which is only a mordant for the coloring-matter without being also a tanning material for gelatin; it would be affected by solutions of other colors. The same would be the case if there was added to the solution of cinnabar-scarlet a tanning agent for gelatin, for instance forma in, which is not a mordant for the coloring matter. Or if the red colored gelatin is subsequently treated with such a tanning material an overcoloring of the red gelatin would occur if it is subjected into a solution of a green or blue coloring matter.

The described treatment with an agent which will both tan the gelatin, and mordant the color, does not make the colored gelatin immune against all other solutions of coloring matter; but the gelatin, the coloring matter and the tanning-mordant, form a chemical complex which will resist those solutions of coloring matter which have no affinity for such chemical complex. The coloring-matters possessing such qualities are selected empirically.

The resistance of the colored gelatin, which has been treated according to the present invention, to other solutions of coloring matter if correctly selected, occurs with such promptness and reliability that it may be due to electrostatic processes; and it may be that the colored gelatin spots receive a uniform electric charge during the process of simultaneous mordanting and tanning, and consequently that they offer resistance to all coloring matters carrying a similar electric charge. However that may be the novel effect is realized and the hereinafter described process for the production of screens of several colors is based on this observation.

The novel process consists in covering the spots or portions of a gelatined surface, (for instance a gelatined glass plate or film,) which are not to take the first color, (for instance red), with a suitable fatty color. This fatty color may be readily applied, for instance, by means of a printing surface corresponding in extent to the gelatined surface. Thereupon the thin printed gelatin surface is dipped into the first, (for instance, red) solution, (say a solution of cinnabar-scarlet-G) which will color red only those portions of the gelatin surface which are not protected by the fatty color. After the exposed parts of the gelatin surface have assumed the required intensity of color, the plate is dipped into a solution of ferric chlorid and the excess of color washed off; the plate is then dried and finally the fatty color is washed off, with turpentine or the like. As a result of this treatment, the gelatined surface of the plate is now covered with red spots, lines, or the like, corresponding exactly with the portions not protected by the fatty color. The resultant red-colored gelatin spots possess in consequence of their treatment with a mordant tanning the gelatin, (in the present example ferric chlorid), the peculiarity of resisting solutions of coloring matter possessing no affinity for the said complex (gelatin, cinnabar-scarlet, ferric chlorid.) A coloring matter, and one suitable for producing a blue ground color, is "methyl-blue for silk M. L. B." (of the Huchster Colour Works). The said red spotted gelatined surface may now be again printed with fatty color to cover those portions or spots of the still uncolored gelatin surface, which are not to take any blue color; and such printed plate is then dipped into a solution of the blue coloring matter. For the said blue coloring matter ferric chlorid is a mordant. In such blue color bath the portions of the gelatin surface which are not red and which are not covered by the fatty color become blue, while the other parts remain unchanged. The plate is then again dipped into a solution of ferric chlorid; washed; dried and then the second fatty color is also washed off. If the two fatty color prints consisted, for instance, of two systems of lines crossing each other, the gelatin surface would now be found covered with red lines, between which there are blue rectangles, while the remaining spaces are still uncolored.

For the third or green coloring a solution of a coloring matter which is repulsed by cinnabar-scarlet, ferric chlorid, gelatin; as well as by methyl-blue ferric chlorid gelatin, should be selected. It is not absolutely necessary that this third coloring matter be fixed or immunized on the gelatin, as a further treatment of the plate in coloring solutions is not desired. But it is desirable that the green elements be also treated in the same manner as the first two colors. A spectroscopically correct green coloring matter, which answers the above conditions, can be obtained for example by dissolving a mixture of "patent blue A" in "yellow E", (both of the "Huchster Color Works"). For such green coloring matter ferric chlorid, also acetate of aluminium, is a mordant. By subjecting the plate to a solution of the green coloring matter, the uncolored gelatin spots are colored green, while the parts of the plate colored by the first and second steps, are unchanged. By subsequently treating the plate with ferric chlorid the green color is fixed on the gelatin. The three color plate or screen after drying may then be varnished.

In the accompanying drawings I have illustrated diagrammatically the process of producing such a three color screen or plate.

Figure 2:
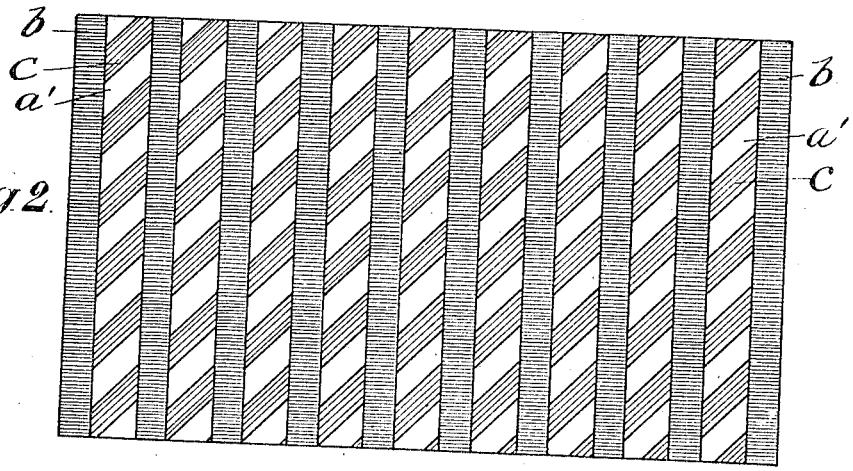
Figure 3:
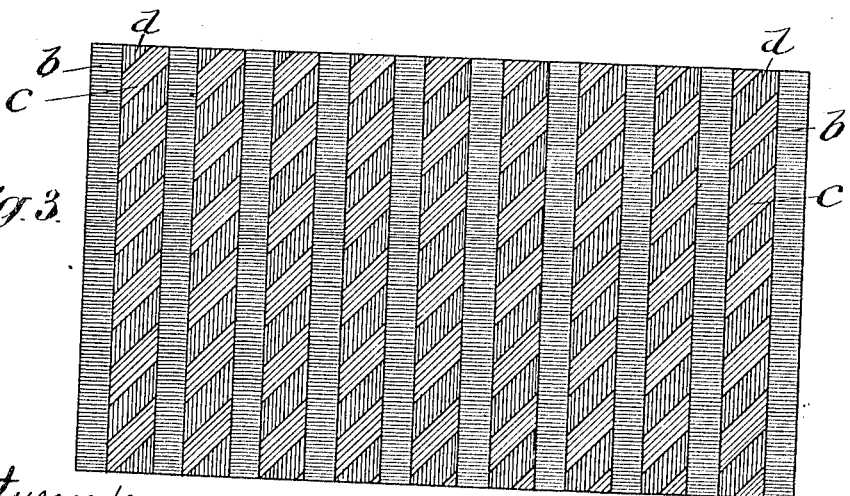

Figure 1 is a view of the screen plate showing the first steps of the process. Fig. 2 is a similar view showing the second step of the process. Fig. 3 is a view of the complete screen plate.

Referring to Fig. 1, $a$ indicates parts of the gelatined surface of the plate which have been printed with fatty ink; $b$ indicates the parts which have been colored by dipping such printed plate in the first, for instance (red) solution.

In Fig. 2, $a'$ indicates the portions of such plate printed with fatty ink so as to remain free from the second color, and when the plate is dipped into the second coloring solution, say blue, the parts, indicated at $c$, not protected by the fatty ink and the previous color, will be colored blue; and when the fatty ink is washed off and the plate dipped into a third color solution, say green, the parts indicated at $d$ in Fig. 3, (and at $a'$ in Fig. 2) will be colored green.

The strength of the color solution may be varied; for examples merely I mention the following; but do not limit myself to the combinations or proportions stated. The red, or first color solution, may be composed of: 50 g. cinnabar-scarlet-G, 1000 c. c. water, and 50 c. c. concentrated acetic acid. The green, or second color solution, may be composed of: 10 g. methanyl yellow, 40 g. patent blue, 1000 c. c. water. The third or blue color solution may be composed of: an aqueous solution of methyl-blue.

What I claim is:

1. The herein described process of making color screens, consisting in successively protecting or covering parts of a gelatin surface with a coating impervious to color and mordant and which can be removed, and then coloring the parts not protected or previously colored; the gelatin after each coloring being treated with an agent which acts as a mordant for the applied coloring matter and also as a tanning means for the gelatin.

2. The process of producing color screens, consisting in coating with a fatty substance which can be washed off, those parts of a gelatined surface which are to remain untouched by the ground color used, said fatty substance being impervious to color and mordant; then coloring the open interspaces of the coated gelatin surface with the ground color, then treating the colored spots with an agent which acts as a mordant for the applied coloring matter and also as a tanning means for the gelatin; then drying the screens and removing the fatty substance, substantially as set forth.

3. The process of producing three color screens, consisting in coating with a fatty substance which can be washed off, those parts of a gelatined surface which are to remain untouched by the first ground color used, said fatty substance being impervious to color and mordant; then coloring the open interspaces of the coated gelatined surface in the first ground color, and treating the colored spots with an agent which acts as a mordant and also as a tanning material for gelatin; then drying the screens and washing the fatty substance off; then applying a second coat of fatty substance to the uncolored parts of the gelatin surface which are to remain untouched by the second ground color, then coloring the open interspaces of the gelatin surface with the second ground color, then treating the same with such a tanning and mordanting agent; then removing the fatty substance; and finally applying a third ground color, substantially as set forth.

In testimony whereof I have signed my name to this specification in the presence of two subscribing witnesses.

ROBERT KRAYN.

Witnesses:
 HENRY HASPER,
 WOLDEMAR HAUPT.